United States Patent
Hao et al.

(10) Patent No.: US 10,190,561 B1
(45) Date of Patent: Jan. 29, 2019

(54) SYSTEM AND METHOD FOR RAPID ENGINE START

(71) Applicant: GM Global Technology Operations LLC, Detroit, MI (US)

(72) Inventors: Lei Hao, Troy, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/718,681

(22) Filed: Sep. 28, 2017

(51) Int. Cl.
| | | |
|---|---|---|
| F02N 11/00 | (2006.01) | |
| F02N 11/08 | (2006.01) | |
| H02K 11/215 | (2016.01) | |
| H02P 3/12 | (2006.01) | |
| H02K 7/00 | (2006.01) | |

(52) U.S. Cl.
CPC ...... *F02N 11/0814* (2013.01); *F02N 11/0851* (2013.01); *H02K 7/003* (2013.01); *H02K 11/215* (2016.01); *H02P 3/12* (2013.01); *F02N 2300/106* (2013.01)

(58) Field of Classification Search
CPC .............. F02N 11/0811; F02N 11/0814; F02N 11/0851; F02N 2300/106; H02K 11/215; H02K 7/003; H02P 3/12
See application file for complete search history.

(56) References Cited

U.S. PATENT DOCUMENTS

| | | | | |
|---|---|---|---|---|
| 5,495,127 A | * | 2/1996 | Aota | B60K 6/485 290/31 |
| 2004/0149247 A1 | * | 8/2004 | Kataoka | F02N 11/006 123/179.4 |
| 2005/0229889 A1 | * | 10/2005 | Hoevermann | F02D 41/009 123/179.4 |
| 2006/0048734 A1 | * | 3/2006 | Kataoka | B60K 6/485 123/179.4 |
| 2008/0168959 A1 | * | 7/2008 | Katayama | F01L 1/34 123/179.3 |
| 2017/0254310 A1 | * | 9/2017 | Nakaoka | F02D 35/02 |
| 2017/0328326 A1 | * | 11/2017 | Fujita | F02D 41/062 |
| 2018/0159410 A1 | * | 6/2018 | Hino | F02N 11/00 |
| 2018/0230958 A1 | * | 8/2018 | Canitrot | F02N 19/005 |

* cited by examiner

Primary Examiner — Thomas Moulis
(74) Attorney, Agent, or Firm — Quinn IP Law

(57) ABSTRACT

A method of rapid starting an internal combustion engine includes determining that the engine is stopped and detecting an engine start request. The method also includes enabling a starter assembly having a brushless electric motor including a stator and a rotor and configured to drive a pinion gear, and engaging the pinion gear with the engine flywheel. The method also includes determining a present angular position of the rotor relative to the stator configured to generate a first rotor torque. The method additionally includes applying an electrical current to the motor, in response to the determined angular position of the rotor, to turn the rotor to a predetermined starting angular position configured to provide a second torque that is greater than the first torque. Furthermore, the method includes commanding the motor to spin the rotor and thereby apply the second torque via the pinion gear to start the engine.

20 Claims, 3 Drawing Sheets

SYSTEM AND METHOD FOR RAPID ENGINE START

INTRODUCTION

The disclosure relates to a system and a method for rapid starting of an internal combustion engine in a stop-start system of a motor vehicle.

A motor vehicle may employ a single or multiple power-sources. Such vehicles may either employ a powertrain where internal combustion engine(s) are used to propel the vehicle, or a hybrid powertrain, where two or more distinct power-sources, are used to accomplish the same task. To maximize fuel efficiency and reduce exhaust emissions of such a powertrain, the vehicle's internal combustion engine may be equipped with start-stop capability.

Start-stop capability may be used to shut off the internal combustion engine when the engine's torque is not required for driving the vehicle. Such a situation may be encountered when the subject vehicle is maintaining a steady cruising speed, is in a coast down mode, i.e., when the vehicle is decelerating from elevated speeds, or the vehicle is stopped. In the event start-stop capability is employed when the vehicle is brought to a stop, such as by application of the vehicle's brake pedal, typically, the engine is automatically shut off, and is then automatically restarted when the vehicle operator releases the brake pedal. In an engine having a start-stop capability, an alternator/motor may be specifically designed to quickly restart an engine that has been shut off, when vehicle motion is again desired.

SUMMARY

A method of rapid starting an internal combustion engine having a crankshaft flywheel in a vehicle includes determining, via an electronic controller, that the internal combustion engine is stopped and detecting, via the controller, an engine start request. The method also includes enabling, via the controller, a starter assembly having a brushless electric motor including a stator and a rotor and configured to drive a pinion gear, and engaging the pinion gear with the flywheel. The method also includes determining, via the controller, a present angular position of the rotor relative to the stator, wherein the present angular position is configured to generate a first rotor torque. The method additionally includes applying an electrical current to the electric motor, in response to the determined angular position of the rotor, to turn the rotor to a predetermined starting angular position relative to the stator configured to provide a second torque that is greater than the first torque. Furthermore, the method includes commanding the electric motor, via the controller, to spin the rotor and thereby apply the second torque via the pinion gear to start the internal combustion engine.

The starter assembly may include a quadrature encoder and at least one Hall effect sensor, each in electrical communication with the controller. In such an embodiment, the determining of the present angular position of the rotor relative to the stator may include initially detecting the angular position of the rotor in low resolution via the at least one Hall effect sensor and also include subsequently detecting the angular position of the rotor in high resolution via the quadrature encoder.

There may be used up to three Hall effect sensors. For example, three such sensors may be spaced 120 degrees apart with respect to a rotational cycle of the rotor. Furthermore, the quadrature encoder and the three Hall effect sensors may be combined into a single sensor assembly in electrical communication with the controller.

The vehicle may include an electrical system having an electrical energy source, such as a battery, configured to provide an electrical current to the controller and the starter assembly. In such an embodiment, the method may additionally include, via the controller, an amount of the current applied to the electric motor via the electrical energy source, and an amount of voltage generated across the electric motor.

The stator may include multi-phase windings. The method may also include determining, via the controller, a speed of the rotor relative to the stator, comparing the determined speed of the rotor to a reference maximum speed of the rotor, and shorting the multi-phase windings of the stator when the determined speed of the rotor is greater than the reference maximum speed.

The method may also include determining, via the controller, a speed of the rotor relative to the stator, comparing the determined speed of the rotor to a reference maximum no-load speed of the rotor; and opening the multi-phase winding of the electric motor when the determined speed of the rotor is less than the reference maximum no-load speed.

The method may additionally include determining, via the controller, an amount of time the rotor has been spun, comparing the determined amount of time the rotor has been spun to a reference maximum amount of time, and disabling the electric motor when the determined amount of time the rotor has been spun is greater than the reference maximum amount of time.

The method may further include detecting a first command and a second command separated by a time interval to start the internal combustion engine via the starter assembly, determining, via the controller, a time interval between the first command and the second command, comparing the determined time interval between the first command and the second command to a reference minimum time interval, and disabling the electric motor when the determined time interval between the first command and the second command is smaller than the reference minimum reference time interval.

The rapid start of the internal combustion engine may be a key start. In such an embodiment, detecting the engine start request may include detecting a key-on event.

The vehicle may be equipped with an automatic stop/start feature for the internal combustion engine enabled when the vehicle is stopped. In such an embodiment, the rapid start of the internal combustion engine may be an automatic restart following a stop of the engine. Additionally, detecting the engine start request may include detecting a request for the restart request for the internal combustion engine following the vehicle being stopped.

The controller may be programmed with the predetermined starting angular position of the rotor relative to the stator configured to provide the second torque. In such an embodiment, the method may also include, via the controller, accessing the internal memory and comparing the determined angular position of the rotor to the predetermined starting angular position of the rotor.

A vehicle employing an electronic controller configured to perform the above method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
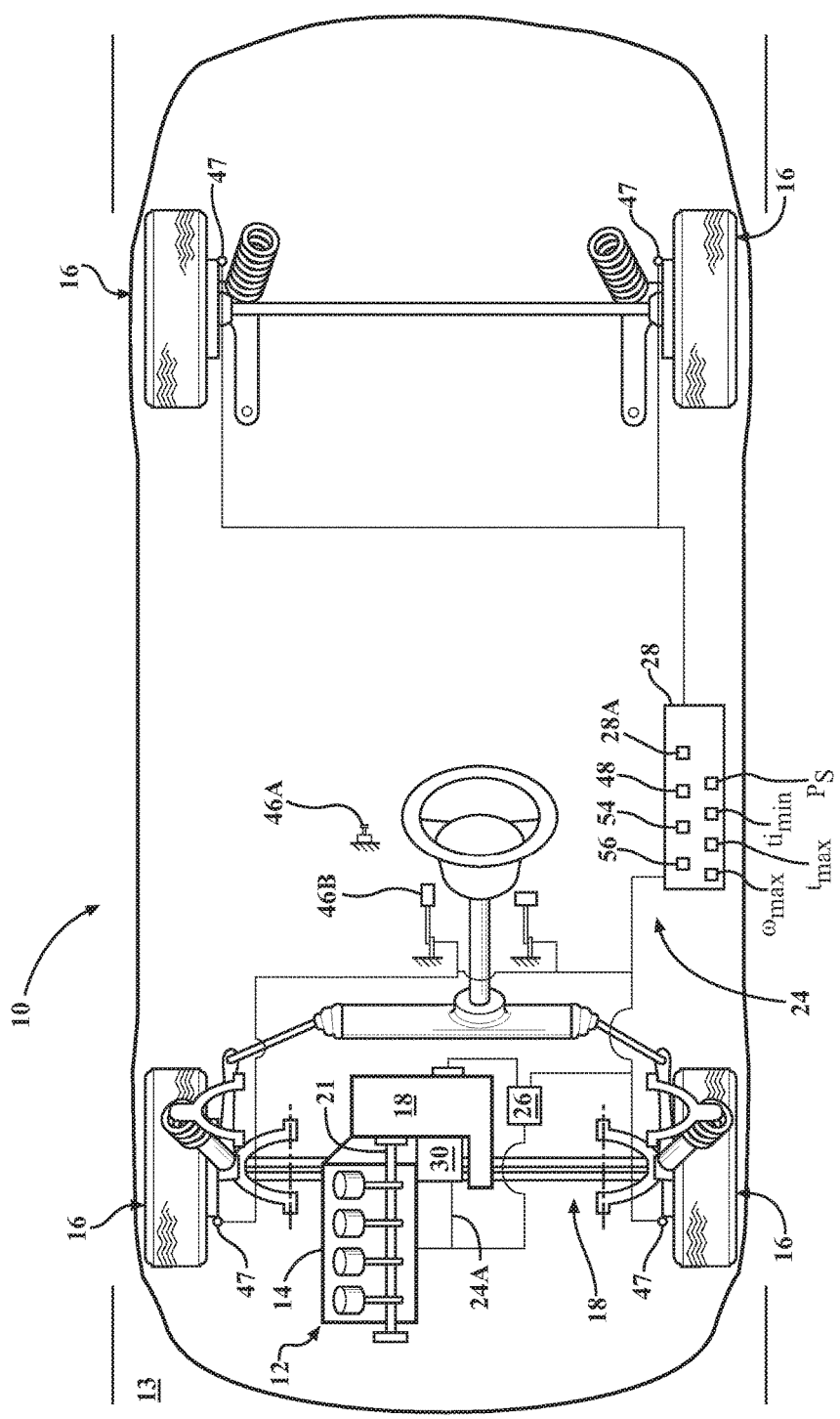
FIG. 1 is a schematic illustration of a vehicle employing a powertrain with an internal combustion engine and a starter assembly employing a brushless electric motor configured to affect rapid starting the engine according to the disclosure.

Referring to the drawings in which like elements are identified with identical numerals throughout, FIG. 1 illustrates a vehicle 10 having a powertrain 12. The powertrain 12 operatively connected to a set of driven wheels for providing propulsion of the vehicle 10. Specifically, the powertrain 12 includes an internal combustion engine 14 configured to generate engine power and torque and operatively connected to a set of driven wheels 16 for driving the vehicle 10. As shown, the engine 14 transmits engine output torque to a road surface 13 through a transmission 18 to the driven wheels 16. As contemplated herein, the transmission 18 may be a multi-speed automatically-shiftable transmission that utilizes a gear train and multiple torque-transmitting devices to generate discrete gear ratios between an input and an output of the transmission, or a continuously variable transmission (CVT).

Figure 2:
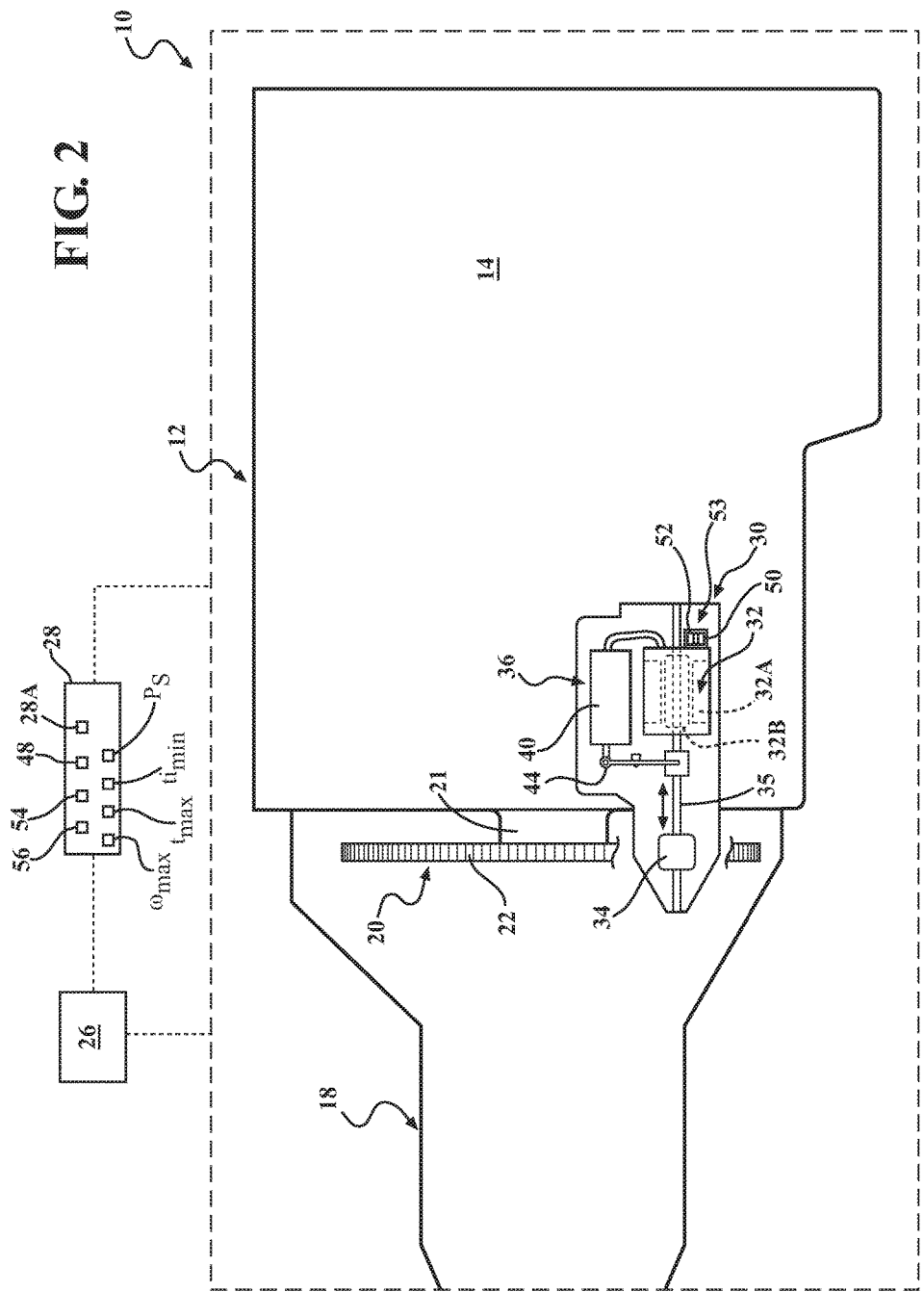
FIG. 2 schematically illustrates a close-up view of the internal combustion engine and the starter assembly shown in FIG. 1.

The engine 14 receives a supply of fuel in discrete fueling events, wherein such fuel is combined with air into a fuel-air mixture for subsequent ignition either via a spark plug (not shown) or via a compression event to thereby generate combustion and produce power. As shown in FIG. 2, the engine 14 includes a flywheel (or a flex-plate) 20 attached to a crankshaft 21 of the engine, and, as such, rotates at the same speed as the engine. The flywheel 20 is typically attached to the crankshaft 21 via fasteners such as bolts or screws (not shown). A ring gear 22 having a specific gear tooth profile and spacing, is arranged on the outer perimeter of the flywheel 20. The ring gear 22 typically has an outer diameter that is designed to facilitate effective starting of engine 14.

The vehicle 10 includes an electrical system 24 having an electrical wire conduit, such as a communication bus 24A, and an electrical energy source 26, for example, an energy storage device, such as one or more batteries. The electrical energy source 26 is configured to selectively accept/store an electrical charge, and, on demand, generate an electrical current to operate the engine 14 and various other vehicle systems, such as will be described in greater detail below. The vehicle 10 includes an electronic controller 28 in electrical communication with the energy source 26 and configured to regulate operation of the engine 14. The vehicle 10 also includes a starter assembly 30 powered by the energy source 26 and configured to start the internal combustion engine 14 on demand. An exemplary schematic representation of the starter assembly 30 is shown in FIG. 2. As shown in FIG. 2, the starter assembly 30 is arranged relative to the engine 14 in close proximity to the ring gear 22 for starting the engine. The starter assembly 30 is used for quickly starting and spinning the engine 14 up to operating speeds as part of an engine stop-start arrangement. The starter assembly 30 may be mounted directly on the engine 14 to reduce the effect of manufacturing tolerances, as depicted in FIG. 2.

The starter assembly 30 includes a brushless electric motor or machine 32 that is employed to rotate a pinion gear 34. The pinion gear 34 configured to slide along a shaft 35 and may be coupled to the shaft via a one-way clutch (not shown). The electric motor 32 may be configured as a 12-volt or a 48-volt motor that receives its electrical energy from the energy source 26. The pinion gear 34 includes a gear tooth profile and spacing that corresponds to that of the ring gear 22 for accurate meshing and engagement therewith. The starter assembly 30 also includes a pinion engagement solenoid assembly 36, which incorporates a pinion-shift solenoid 40. The brushless electric motor 32 includes a stator 32A and a rotor 32B and configured to drive a pinion gear 34. The stator 32A may include three-phase or multi-phase windings. The pinion-shift solenoid 40 is configured to energize a lever arrangement 44. When energized by the pinion-shift solenoid 40, the lever arrangement 44 in turn displaces the pinion gear 34 along the shaft 35 for meshed engagement with the ring gear 22, in order to start the engine 14. During the starting of engine 14, each engine cranking revolution is accompanied by a fueling event adapted to deliver an appropriate amount of fuel to the engine in order to affect the firing, combustion, and sustained rotation of the engine.

The electronic controller 28 is configured or programmed to generally regulate operation of the engine 14, and the starter assembly 30, in particular. In the embodiment of the controller 28 configured to regulate operation of the engine 14, the controller 28 may be arranged outside of the brushless machine 32 (as shown in FIG. 2). Alternatively, in the embodiment of the controller 28 configured to regulate solely the brushless machine 32, the controller may be integrated together with the brushless machine (not shown). As envisioned herein, the controller 28 may include a central processing unit (CPU) employed to regulate and coordinate propulsion of the vehicle 10, which includes the operation of the engine 14, the transmission 18, and the starter assembly 30. The controller 28 includes a memory 28A, at least some of which is tangible and non-transitory. The memory may be a recordable medium that participates in providing computer-readable data or process instructions. Such a medium may take many forms, including but not limited to non-volatile media and volatile media. Non-volatile media for the controller 28 may include, for example, optical or magnetic disks and other persistent memory. Volatile media may include, for example, dynamic random access memory (DRAM), which may constitute a main memory.

Above-noted instructions may be transmitted by one or more transmission medium, including coaxial cables, copper wire and fiber optics, including the wires that comprise a system bus coupled to a processor of a computer. Memory of the controller 28 may also include a flexible disk, hard disk, magnetic tape, other magnetic medium, a CD-ROM, DVD, other optical medium, etc. The controller 28 can be configured or equipped with other required computer hardware, such as a high-speed clock, requisite Analog-to-Digital (A/D) and/or Digital-to-Analog (D/A) circuitry, necessary input/output circuitry and devices (I/O), as well as appropriate signal conditioning and/or buffer circuitry. Algorithms required by the controller 28 or accessible thereby may be stored in the memory and automatically executed to provide the required functionality.

The controller 28 is in operative communication with each of the starter assembly 36 and the energy storage source 26. The controller 28 is specifically configured to affect a rapid starting of the internal combustion engine 14 via determining that the engine is stopped. Whether the engine 14 is running or stopped may be determined with the aid of a crankshaft 21 position sensor (not shown). As part of the rapid start of the engine 14, the controller 28 is also configured to detect an engine start request, which may be initiated by an operator of the vehicle 10 via a key-on event, i.e., via an engine start switch 46A such as a key or a push-button, or by triggering an accelerator pedal 46B configured to set the vehicle in motion (shown in FIG. 1). Specifically, the controller 28 is programmed to activate starter assembly 36 on demand to extend the pinion gear 34 and restart the engine 14, based on predetermined vehicle operating parameters. The appropriate vehicle 10 operating parameters may be predetermined empirically during calibration and testing phases of vehicle development, with the aim of optimizing performance, drivability and efficiency of the subject vehicle.

The rapid start of the internal combustion engine 14 may be effected by a key start. In such an embodiment, detection of the engine 14 start request by the controller 28 may include detecting the key-on event triggered via the switch 46A. As indicated above, the vehicle 10 may also include an automatic stop/start feature for the internal combustion engine 14 enabled when the vehicle is stopped. Whether the vehicle 10 is moving or stopped may be determined with the aid of speed sensors 47 in electronic communication with the controller 28 and configured to detect rotational speeds of the wheels 16, as shown in FIG. 1. In such an embodiment, the rapid start of the engine 14 may be an automatic restart following a stop of the engine. Furthermore, detection of the engine 14 start request by the controller 28 may include detecting a restart request for the engine, for example via the operator's application of the accelerator pedal 46B, following the vehicle 10 being stopped, such as for a red traffic light. The controller 28 is also configured to authorize engagement of the pinion gear 34 with the flywheel 20 by enabling, via a directed command 48, the pinion engagement solenoid assembly 36 of the starter assembly 30. The controller 28 is additionally configured to engage the pinion gear 34 with the flywheel 20, such as by commanding the pinion-shift solenoid 40 to energize the lever arrangement 44.

The controller 28 is also configured to determine a present angular position $P_p$ of the rotor 32B relative to the stator 32A. The subject present angular position $P_p$ is configured to generate, i.e., capable of no more than, a first rotor torque $T_1$ using the electrical current generated by the energy source 26. The controller 28 is additionally configured to apply an electrical current to the electric motor 32 in response to the determined present angular position $P_p$ of the rotor. Specifically, an amount of the electrical current is selected by the controller 28 to turn the rotor 32B to a predetermined starting angular position $P_s$ relative to the stator 32A, wherein the starting angular position is configured to provide a second torque $T_2$ that is greater than the first torque $T_1$. Moreover, the second torque $T_2$ is intended to be the maximum torque available from the starter assembly 30 using the electrical current generated by the energy source 26. The controller 28 is also configured to command the electric motor 32 to spin the rotor 32B at a particular speed, and thereby apply the second torque $T_2$ via the pinion gear 34 to start the engine 14.

Determination of the present angular position $P_p$, as well as verification of the predetermined starting angular position $P_s$, of the rotor 32B relative to the stator 32A may be accomplished via a two-step process. Initially the determination may be made in low resolution to identify a circular quadrant the rotor resides in, and subsequently in high resolution to identify with precision the position within the subject quadrant. To achieve such a two-step process, the starter assembly 30 may include one or more Hall effect sensors 50 configured to detect angular positioning of the rotor 32B in low resolution via detecting angular position of the rotor 32B relative to the stator 32A within one of a particular number of sectors. Typically, a Hall effect sensor is a transducer that varies its output voltage in response to a magnetic field. In general, Hall effect sensors are used for proximity switching, positioning, speed detection, and electrical current sensing applications. Specifically, the starter assembly 30 may include up to three Hall effect sensors 50 configured to detect angular positioning of the rotor 32B within one of six 60-degree sectors. The starter assembly 30 may further include a quadrature encoder 52 configured to detect angular positioning of the rotor 32B in high resolution within a single quadrant of rotor rotation, for example to within approximately 0.1 degrees, as well as detect a rotational speed of the rotor. In general, a quadrature encoder is an incremental rotary encoder used to sense a direction of a rotating component's movement and speed. As shown in FIG. 2, each of the Hall effect sensor(s) 50 and the quadrature encoder 52 may be in electrical communication with the controller 28.

The controller 28 may be configured to use the signals from both the Hall effect sensor(s) 50 and the quadrature encoder 52 to obtain a high accuracy determination of the angular position of the rotor 32B. Accordingly, the determination of the present angular position of the rotor 32B relative to the stator 32A via the controller 28 may include initially detecting the angular position of the rotor 32B in low resolution via the Hall effect sensor(s) 50 and subsequently detecting the angular position of the rotor in high resolution via the encoder 52. To affect appropriate resolution and high accuracy determination of the angular position of the rotor 32B, three individual Hall effect sensors 50 spaced 120 degrees apart with respect to a rotational cycle of the rotor may be employed. Moreover, the quadrature encoder 52 and the Hall effect sensor(s) 50 may be combined into a single or integrated sensor assembly 53 in electrical communication with the controller 28.

The controller 28 may be programmed with the predetermined starting angular position $P_s$ of the rotor 32B, which may be stored within the non-volatile memory 28A. The controller 28 may be additionally configured to access the memory 28A to compare the determined angular position $P_p$ of the rotor to the predetermined starting angular position $P_s$. The controller 28 may also be programmed with a look-up table 54, which may include differences between discrete angular positions $P_p$ and the predetermined starting angular position $P_s$ of the rotor 32B. The subject table 54 may additionally include a cross-reference between the subject $P_p$-$P_s$ position differences and specific values of electrical current required to turn the rotor 32B to the required starting angular position $P_s$. The look-up table 54 may be constructed from empirically collected data and programmed into the controller 28 for subsequent access during operation of the vehicle 10 for setting the rotor 32B to the predetermined starting angular position $P_s$. Accordingly, the precise determination and setting of the position of rotor 32B enables generation of the maximum torque, the second torque T2, via the starter assembly 30 and thereby affects the rapid starting of the engine 14.

The controller 28 may be further configured to affect the rapid starting of the engine 14 via determining an amount of the current applied to the electric motor 32 via the electrical energy source 26, and an amount of voltage generated across the electric motor. The controller 28 may also be programmed to detect various faults in operation of the starter assembly 30. In one embodiment, the controller 28 may be programmed to protect the starter assembly 30 against a possible over-speed condition. The maximum rotational speed of the starter assembly 30, as defined by the starter assembly overall gear ratio, is set to a value which is greater than a maximum starting speed of the engine 14 during various engine starting conditions. By setting over-speed condition, it not only ensures that the engine is started, but also is used to disengage the starter for engine after engine is started. In such an embodiment, the controller 28 may be configured to determine a speed of the rotor 32B relative to the stator 32A, such as by using the quadrature encoder 52 and the Hall effect sensor(s) 50. The controller 28 may be additionally configured to compare the determined speed $\omega$ of the rotor 32B to a predetermined reference maximum speed $\omega_{max}$ of the rotor. Furthermore, the controller 28 may be programmed to enter a fault operating mode, if the determined speed $\omega$ of the rotor is greater than the reference maximum speed $\omega_{max}$. The reference maximum speed $\omega_{max}$ of the rotor 32B is determined by operating parameters of the engine 14. Specifically, the magnitude of the reference maximum speed $\omega_{max}$ is selected to ensure that the engine 14 may be matted in various environments and across a wide range of ambient temperatures. The reference maximum speed $\omega_{max}$ is calculated or empirically determined and programmed into and stored within the memory 28A.

In the fault operating mode, the controller 28 may be configured to short all phase windings of the electric motor 32, such as the three-phase windings of the stator 32A, if the determined speed $\omega$ of the rotor is greater than a reference maximum no-load speed $\omega_{max\_noload}$. Alternatively, in the fault operating mode, the controller 28 may be configured open all phase windings of the electric motor 32, if the determined speed $\omega$ of the rotor is less than the reference maximum no-load speed $\omega_{max\_noload}$. When the starter assembly 30 enters the fault operating mode, normal current control mode is disabled via the controller 28. The maximum no-load speed $\omega_{max\_noload}$ is determined by operating parameters of the particular brushless machine 32, and as such is an inherent characteristic of the subject machine. Specifically, for a given voltage, the magnitude of the maximum no-load speed $\omega_{max\_noload}$ is the maximum speed the brushless machine 32 may reach before flux begins to weaken control of the machine when there is no load on the shaft 35.

In another embodiment, the controller 28 may be programmed to protect the starter assembly 30 against a possible over-temperature condition. In such an embodiment, the controller 28 may be configured to determine an amount of time t the rotor 32B has been spun. The controller 28 may be additionally configured to compare the determined amount of time t the rotor has been spun to a reference maximum amount of time $t_{max}$ (calculated or empirically determined and programmed into and stored within the memory 28A). Furthermore, the controller 28 may be configured to enter the fault operating mode, if or when the determined amount of time t the rotor 32B has been spun is greater than the reference maximum amount of time $t_{max}$.

In an additional embodiment, the controller 28 may be programmed to protect the starter assembly 30 against a possible over-temperature condition via a separate approach. Specifically, in such an additional embodiment, the controller 28 may be configured to detect a first command and a second command separated in time, i.e., by a time interval ti, to start the engine 14 via the starter assembly 30. The controller 28 may be also configured to determine, such as via the controller's high-speed clock, the time interval ti between the first and second commands. The controller 28 may be additionally configured to compare the determined time interval ti between the first command and the second command to a reference minimum time interval $ti_{min}$ (calculated or empirically determined and programmed into and stored within the memory 28A). Furthermore, the controller 28 may be configured to disable the electric motor 32, if or when the determined time interval ti between the first and second commands is smaller than the reference minimum reference time interval $ti_{min}$.

In a further embodiment, the controller 28 may be programmed to protect the starter assembly 30 against a possible over-voltage condition. The starter assembly 30 is capable of generating a voltage that exceeds an output voltage of the energy source 26. However, such excessive voltage may be detrimental to durability of other electrical system 24 components. Accordingly, the controller 28 may perform an over-voltage detection for brushless electric motor 32 using an average number of discrete voltage value samples. Specifically, the controller 28 may be configured to detect, such as by directly sensing via an appropriate sensor (not shown), a number of consecutive discrete voltage values in the communication bus 24A and across the electric motor 32 over a predetermined time frame, such as 1-5 milliseconds, and determine an average voltage value of the detected discrete voltage values. The number of such discrete voltage values used to obtain the average voltage value may, for example, be between 2 and 10. Following the above, the controller 28 may compare the determined average voltage value with a predetermined maximum voltage value. If the determined average voltage value is greater than the predetermined maximum voltage value and the determined speed $\omega$ of the rotor 32B is greater than the reference maximum no-load speed $\omega_{max\_noload}$, the controller 28 may set an over-voltage fault.

In another embodiment, the controller 28 may be programmed to protect the starter assembly 30 against a possible over-current condition. Specifically, the controller 28 may be programmed to perform an over-current detection for brushless electric motor 32 using an average number of discrete current value samples. The controller 28 may be configured to detect, such as by directly sensing via an appropriate sensor (not shown), a number of consecutive discrete electrical current values, which may be performed for both phase A and phase B currents, transmitted by the communication bus 24A to the electric motor 32 over a predetermined time frame, such as 100-200 microseconds. The controller 28 may then determine an average current value using the detected discrete current values. The number of such discrete current values used to obtain the average current value may, for example, be between 2 and 10. Following the above, the controller 28 may compare the determined average current value with a predetermined maximum current value, which may be separately performed for both phase A and phase B currents. If the determined average current value is greater than the predetermined maximum current value, the controller 28 may set an over-current fault. Any of the above-described faults may be stored by the controller 28 within the memory 28A and/or communicated to the operator of the vehicle 10 or a vehicle service provider via a sensory signal 56 such as a digital error code or a warning indicator.

Figure 3:
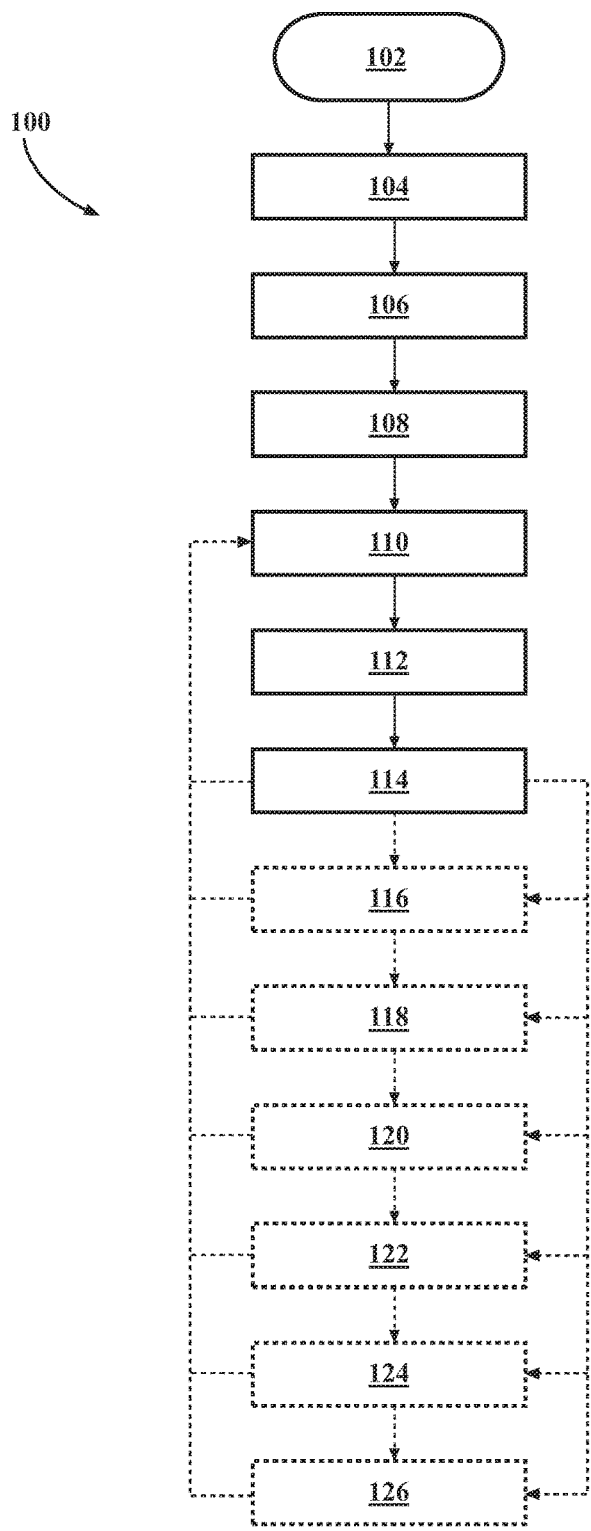
FIG. 3 schematically illustrates a method of rapid starting the internal combustion engine shown in FIGS. 1 and 2.

A method 100 of rapid starting the internal combustion engine 14 employed for propulsion of the vehicle 10 is shown in FIG. 3, and described below with reference to the structure shown in FIGS. 1 and 2. Method 100 commences in frame 102 with determining that the engine 14 is stopped. Following frame 102, the method proceeds to frame 104, where the method includes detecting an engine 10 start request. As described above with respect to FIGS. 1 and 2, such an engine start may be affected while the subject vehicle is stationary, and is applicable for either an ordinary key-on engine start or for an automatic engine restart during a stop-start maneuver. After frame 104, the method advances to frame 106. In frame 106, the method includes enabling, via the command 48, the starter assembly 30 having the brushless electric motor 32. Enabling the starter assembly 30 in frame 104 may include detecting and assessing analog inputs, via the controller 28, such as phase A and B currents, bus 24A voltage and current. Additionally, enabling the starter assembly 30 may include detecting and assessing digital inputs, via the controller 28, including via the Hall effect sensor(s) 50 and the quadrature encoder 52, in response to the engine 10 start request. From frame 106, the method moves on to frame 108 where it includes engaging the pinion gear 34 with the flywheel 20.

Following frame 108, the method proceeds to frame 110. In frame 110 the method includes determining the present angular position $P_p$, of the rotor 32B relative to the stator 32A, wherein the determined present angular position is capable of generating the first rotor torque T1. As described above with respect to FIGS. 1 and 2, the starter assembly 30 may include at least one Hall effect sensor 50 and the quadrature encoder 52, which together may be configured to facilitate a high accuracy determination of the rotor's angular position. Accordingly, determining the present angular position $P_p$ in frame 110 may be accomplished via the Hall effect sensor(s) 50 and the quadrature encoder 52. After frame 110, the method advances to frame 112, where the method includes applying the electrical current to the electric motor 32, in response to the determined angular position $P_p$ of the rotor 32B, to turn the rotor to the predetermined starting angular position $P_s$ configured to provide the second, maximum torque T2. Following frame 112, the method proceeds to frame 114, where the method includes commanding the electric motor 32 to spin the rotor 32B at the required speed to thereby apply the second torque T2 via the pinion gear 34 to start the engine 14.

After frame 114, the method may advance to frame 116. In frame 116 the method may perform over-speed fault detection for the starter assembly 30 by determining a rotational speed ω of the rotor 32B relative to the stator 32A, comparing the determined speed ω of the rotor to a reference maximum speed $ω_{max}$ of the rotor, and enter the fault operating mode, as described with respect to FIGS. 1 and 2, when the determined speed of the rotor is greater than the reference maximum speed. Either following frame 114 or frame 116, the method may proceed to frame 118. In frame 118 the method may perform excessive-operating time fault detection to prevent an over-temperature condition for the starter assembly 30 by determining an amount of time t the rotor 32B has been spun, comparing the determined amount of time t the rotor has been spun to a reference maximum amount of time $t_{max}$, and enter fault operation mode when the determined amount of time t the rotor has been spun is greater than the reference maximum amount of time $t_{max}$. Furthermore, following disabling the electric motor 32, the controller 28 may set and store the over-speed fault within the memory 28A and/or generate the sensory signal 56.

Additionally, following either of the frames 114, 116, or 118, the method may advance to frame 120. In frame 120 the method may perform a minimum-time fault detection to prevent starter over-temperature for the starter assembly 30 by detecting the first command and the second command separated by a time interval t to start the engine 14 via the starter assembly 30, determining the time interval t between the first command and the second command, comparing the determined time interval t between the first command and the second command to the reference minimum time interval $t_{min}$, and disabling the electric motor 32 when the determined time interval t between the first command and the second command is smaller than the reference minimum reference time interval $t_{min}$. Furthermore, following disabling the electric motor 32, the controller 28 may set and store the minimum-time fault within the memory 28A and/or generate the sensory signal 56.

Additionally, following either of the frames 114, 116, 118, or 120, the method may advance to frame 122. In frame 122, the controller 28 may perform the over-voltage detection for the brushless electric motor 32 using an average number of discrete voltage value samples. The controller 28 may detect, such as by directly sensing via an appropriate sensor (not shown), a number of consecutive discrete voltage values in the communication bus 24A and across the electric motor 32 over a predetermined time frame, such as 1-5 milliseconds, and determine an average voltage value of the detected discrete voltage values. The number of such discrete voltage values used to obtain the average voltage value may, for example, be between 2 and 10. Following the above, the controller 28 may compare the determined average voltage value with a predetermined maximum voltage value. If the determined average voltage value is greater than the predetermined maximum voltage value and the determined speed ω of the rotor 32B is greater than the reference maximum speed $ω_{max}$, the controller 28 may set the over-voltage fault within the memory 28A and/or generate the sensory signal 56.

Following either of the frames 114, 116, 118, 120, or 122 the method may advance to frame 124. In frame 124, the controller 28 may perform the over-current detection for the brushless electric motor 32 using an average number of discrete current value samples. The controller 28 may detect a number of consecutive discrete electrical current values, which may be performed for both phase A and phase B currents, transmitted by the communication bus 24A to the electric motor 32 over a predetermined time frame, such as 100-200 microseconds. The controller 28 may then determine an average current value using the detected discrete current values, for example, 2-10 current values.

Following the above, the controller 28 may compare the determined average current value with a predetermined maximum current value, which may be separately performed for both phase A and phase B currents. If the determined average current value is greater than the predetermined maximum current value and the determined speed ω of the rotor 32B is greater than the reference maximum speed $ω_{max}$, the controller 28 may set and store the over-current fault within the memory 28A and/or generate the sensory signal 56. If any of the above faults is detected, the method may loop back to frame 110 following any of the frames 116, 118, 120, 122, or 124 for another control cycle of the starter assembly 30. On the other hand, if none of the above faults is detected, the method may proceed to frame 126 for controlling the energy source 26 to apply appropriate electrical current to the brushless electric motor 32 for generating the requisite torque T2 for starting the engine 14.

Overall, the method 100 is operative to effect the above described rapid start of the engine 14 following either a key-on event or during an automatic engine restart following a stop of the engine. Additionally, the rapid start of the engine 14 may be effectively and relatively inexpensively enabled by the precise determination and setting of the angular position of rotor 32B to the second, maximum, torque T2 position in the starter assembly 30. Furthermore, dedicated hardware, such as the quadrature encoder 52 and Hall effect sensor(s) 50, may be employed to facilitate the requisite determination and setting of the angular position of rotor 32B for generation of the maximum torque T2.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of rapid starting an internal combustion engine having a crankshaft flywheel in a vehicle, comprising:
    determining, via an electronic controller, that the internal combustion engine is stopped;
    detecting, via the controller, an engine start request;
    enabling, via the controller, a starter assembly having a brushless electric motor including a stator and a rotor and configured to drive a pinion gear;
    engaging the pinion gear with the flywheel;
    determining, via the controller, a present angular position of the rotor relative to the stator, wherein the present angular position is configured to generate a first rotor torque;
    applying an electrical current to the electric motor, in response to the determined angular position of the rotor, to turn the rotor to a predetermined starting angular position relative to the stator, wherein the predetermined starting angular position is configured to provide a second torque that is greater than the first torque; and
    commanding the electric motor, via the controller, to spin the rotor and thereby apply the second torque via the pinion gear to start the internal combustion engine.

2. The method of claim 1, wherein the starter assembly includes at least one Hall effect sensor and a quadrature encoder, each in electrical communication with the controller, and wherein determining the present angular position of the rotor relative to the stator includes initially detecting the angular position of the rotor in low resolution via the at least one Hall effect sensor and subsequently detecting the angular position of the rotor in high resolution via the quadrature encoder.

3. The method of claim 2, wherein the at least one Hall effect sensor includes three Hall effect sensors spaced 120 degrees apart with respect to a rotational cycle of the rotor, and wherein the quadrature encoder and the three Hall effect sensors are combined into a single sensor assembly in electrical communication with the controller.

4. The method of claim 1, wherein the vehicle includes an electrical system having an electrical energy source configured to provide an electrical current to the controller and the starter assembly, further comprising determining, via the controller, an amount of the current applied to the electric motor via the electrical energy source, and an amount of voltage generated across the electric motor.

5. The method of claim 4, wherein the stator includes multi-phase windings, the method further comprising:
    determining, via the controller, a speed of the rotor relative to the stator;
    comparing, via the controller, the determined speed of the rotor to a reference maximum speed of the rotor; and
    shorting the multi-phase windings of the stator when the determined speed of the rotor is greater than the reference maximum speed.

6. The method of claim 5, further comprising:
    determining, via the controller, a speed of the rotor relative to the stator;
    comparing, via the controller, the determined speed of the rotor to a reference maximum no-load speed of the rotor; and
    opening the multi-phase winding of the electric motor when the determined speed of the rotor is less than the reference maximum no-load speed.

7. The method of claim 4, further comprising:
    determining, via the controller, an amount of time the rotor has been spun;
    comparing the determined amount of time the rotor has been spun to a reference maximum amount of time; and
    disabling the electric motor when the determined amount of time the rotor has been spun is greater than the reference maximum amount of time.

8. The method of claim 4, further comprising:
    detecting a first command and a second command separated by a time interval to start the internal combustion engine via the starter assembly;
    determining, via the controller, the time interval between the first command and the second command;
    comparing the determined time interval between the first command and the second command to a reference minimum time interval; and
    disabling the electric motor when the determined time interval between the first command and the second command is smaller than the reference minimum reference time interval.

9. The method of claim 1, wherein the vehicle is equipped with an automatic stop/start feature for the internal combustion engine enabled when the vehicle is stopped, and the rapid starting of the internal combustion engine is an automatic restart following a stop of the engine, and wherein detecting the engine start request includes detecting a request for the restart for the internal combustion engine following the vehicle being stopped.

10. The method of claim 1, wherein the controller is programmed with the predetermined starting angular position of the rotor relative to the stator configured to provide the second torque, further comprising, via the controller, accessing the internal memory and comparing the determined angular position of the rotor to the predetermined starting angular position of the rotor.

11. A vehicle comprising:
an internal combustion engine having a crankshaft flywheel and configured to generate power to drive the vehicle; and
an electronic controller configured to affect a rapid starting of the internal combustion engine via:
determining that the internal combustion engine is stopped;
detecting an engine start request;
enabling a starter assembly having a brushless electric motor including a stator and a rotor and configured to drive a pinion gear;
engaging the pinion gear with the flywheel;
determining a present angular position of the rotor relative to the stator, wherein the present angular position is configured to generate a first rotor torque;
applying an electrical current to the electric motor, in response to the determined angular position of the rotor, to turn the rotor to a predetermined starting angular position relative to the stator, wherein the predetermined starting angular position is configured to provide a second torque that is greater than the first torque; and
commanding the electric motor to spin the rotor and thereby apply the second torque via the pinion gear to start the internal combustion engine.

12. The vehicle of claim 11, wherein the starter assembly includes at least one Hall effect sensor and a quadrature encoder, each in electrical communication with the controller, and wherein the controller is further configured to affect the rapid starting via determining the present angular position of the rotor relative to the stator by initially detecting the angular position of the rotor in low resolution via the at least one Hall effect sensor and subsequently detecting the angular position of the rotor in high resolution via the quadrature encoder.

13. The vehicle of claim 12, wherein the at least one Hall effect sensor includes three Hall effect sensors spaced 120 degrees apart with respect to a rotational cycle of the rotor, and wherein the quadrature encoder and the three Hall effect sensors are combined into a single sensor assembly in electrical communication with the controller.

14. The vehicle of claim 11, further comprising an electrical system having an electrical energy source configured to provide an electrical current to the controller and the starter assembly, wherein the controller is further configured to affect the rapid starting via determining an amount of the current applied to the electric motor via the electrical energy source, and an amount of voltage generated across the electric motor.

15. The vehicle of claim 14, wherein the stator includes multi-phase windings, and wherein the controller is further configured to affect the rapid starting via:

determining a speed of the rotor relative to the stator;
comparing the determined speed of the rotor to a reference maximum speed of the rotor; and
shorting the multi-phase windings of the stator when the determined speed of the rotor is greater than the reference maximum speed.

16. The method of claim 15, wherein the controller is further configured to affect the rapid starting via:
determining a speed of the rotor relative to the stator;
comparing the determined speed of the rotor to a reference maximum no-load speed of the rotor; and
opening the multi-phase winding of the electric motor when the determined speed of the rotor is less than the reference maximum no-load speed.

17. The vehicle of claim 14, wherein the controller is further configured to:
determine an amount of time the rotor has been spun;
compare the determined amount of time the rotor has been spun to a reference maximum amount of time; and
disable the electric motor when the determined amount of time the rotor has been spun is greater than the reference maximum amount of time.

18. The vehicle of claim 14, wherein the controller is further configured to:
detect a first command and a second command separated by a time interval to start the internal combustion engine via the starter assembly;
determine the time interval between the first command and the second command;
compare the determined time interval between the first command and the second command to a reference minimum time interval; and
disable the electric motor when the determined time interval between the first command and the second command is smaller than the reference minimum reference time interval.

19. The vehicle of claim 11, further comprising an automatic stop/start feature for the internal combustion engine enabled when the vehicle is stopped, and the rapid start of the internal combustion engine is an automatic restart following a stop of the engine, and wherein detecting the engine start request includes detecting a request for the restart request for the internal combustion engine following the vehicle being stopped.

20. The vehicle of claim 11, wherein the controller is programmed with the predetermined starting angular position of the rotor relative to the stator configured to provide the second torque, and additionally configured to access the internal memory to compare the determined angular position of the rotor to the predetermined starting angular position of the rotor.

* * * * *